(12) United States Patent
Cuprys et al.

(10) Patent No.: US 7,898,503 B2
(45) Date of Patent: Mar. 1, 2011

(54) AUXILIARY TARGETING VIEWER

(75) Inventors: Lawrence M. Cuprys, Felton, CA (US);
Stephen A. Pombo, Campbell, CA (US);
Michael J. Presz, Felton, CA (US);
Antonio V. Bacarella, Dallas, TX (US);
Mark H. Crane, San Jose, CA (US)

(73) Assignee: Kopin Corporation, Taunton, MA (US)

( * ) Notice: Subject to any disclaimer, the term of this patent is extended or adjusted under 35 U.S.C. 154(b) by 954 days.

(21) Appl. No.: 11/403,559

(22) Filed: Apr. 12, 2006

(65) Prior Publication Data

US 2007/0075918 A1 Apr. 5, 2007

Related U.S. Application Data

(60) Provisional application No. 60/670,841, filed on Apr. 13, 2005.

(51) Int. Cl.
*G09G 5/00* (2006.01)
(52) U.S. Cl. .......................................... 345/8; 359/630
(58) Field of Classification Search .................. 345/7–9; 359/630–634; 2/6.2, 6.3, 422; 24/67.3; 349/11
See application file for complete search history.

(56) References Cited

U.S. PATENT DOCUMENTS

| 5,200,827 | A | | 4/1993 | Hanson et al. |
| 5,331,684 | A | * | 7/1994 | Baril et al. ........................ 2/6.2 |
| 5,506,730 | A | * | 4/1996 | Morley et al. ................ 359/815 |
| 5,581,806 | A | * | 12/1996 | Capdepuy et al. ................ 2/6.2 |
| 5,786,932 | A | * | 7/1998 | Pniel ............................ 359/409 |
| 5,867,313 | A | * | 2/1999 | Schweitzer et al. .......... 359/418 |
| 6,452,572 | B1 | * | 9/2002 | Fan et al. ......................... 345/8 |
| 6,457,179 | B1 | * | 10/2002 | Prendergast .................... 2/6.2 |
| 2003/0196859 | A1 | * | 10/2003 | Asano .......................... 188/361 |
| 2004/0008157 | A1 | | 1/2004 | Brubaker et al. |
| 2004/0125047 | A1 | * | 7/2004 | Crane et al. ..................... 345/8 |
| 2004/0244099 | A1 | * | 12/2004 | Prendergast .................... 2/422 |
| 2006/0130288 | A1 | * | 6/2006 | Carls ........................... 24/67.3 |
| 2006/0174401 | A1 | * | 8/2006 | Prendergast .................... 2/422 |

FOREIGN PATENT DOCUMENTS

EP 0 671 646 A1 3/1995

* cited by examiner

*Primary Examiner*—Amare Mengistu
*Assistant Examiner*—Hong Zhou
(74) *Attorney, Agent, or Firm*—Hamilton, Brook, Smith & Reynolds, P.C.

(57) ABSTRACT

A head mounting viewing system includes a viewer having a microdisplay for displaying images. Viewing optics can be included for viewing the display. The display and the optics can be housed in a housing. Integrated operational controls can be located on the housing for controlling the operation of the viewer.

18 Claims, 10 Drawing Sheets

AUXILIARY TARGETING VIEWER

RELATED APPLICATION

This application claims the benefit of U.S. Provisional Application No. 60/670,841, filed on Apr. 13, 2005. The entire teachings of the above application are incorporated herein by reference.

BACKGROUND

Head mounted viewing systems can display images in an eyepiece for viewing by the user. Some viewing systems can include a monocular-type device so that one eye is free. It is sometimes desirable to mount such a viewing system to headwear, such as a helmet for military applications.

SUMMARY

The present invention can provide a compact head mounted viewing system that is suitable for mounting to a helmet for military use and is configured for easy operation by the user.

Embodiments of the head mounting viewing system can include a viewer having a microdisplay for displaying images. Viewing optics can be included for viewing the display. The display and the optics can be housed in a housing. Integrated operational controls can be located on the housing for controlling the operation of the viewer.

In particular embodiments, the viewer can be a targeting viewer. Video images can be displayed on the display and can include composite video images. The images can be associated with at least one of a thermal weapons sight, a target acquisition system and a weapons firing system. The display can be shock resistant. The viewer can be a monocular-type viewer and mounted to a helmet with a mounting assembly. The integrated operational controls can include at least one of on/off, brightness control, contrast control, color selection and standby mode controls. An optics adjustor can be coupled to the optics for adjusting the optics. The viewer can include integrated display electronics and an eye cup for shielding light. The viewer can be a first viewer for providing viewing to a first eye and a second viewer can provide viewing to a second eye. The first and second viewers can provide binocular viewing.

The present invention can additionally provide a mounting assembly for a head mounting viewer including a securement portion for securing to headwear. A mounting member can be coupled to the securement portion. The viewer can be mounted to the mounting member. The mounting member can be capable of moving relative to the securement portion to move the viewer to first and second positions to position the viewer in front of either eye of a user.

In particular embodiments, the mounting member can pivot horizontally along the mounting member joint about a first vertical axis. The mounting member can include a mounting location for mounting the viewer which can be offset from the first vertical axis. The mounting location can include an adaptor which can be secured to the viewer. The adaptor can be capable of pivoting along an adaptor joint about a second vertical axis for pivoting the viewer about the second vertical axis. The adapter joint can be locked with a locking mechanism and can be locked in two positions about 180° apart. The locking mechanism can include a spring loaded locking member that can be disengaged by a release member. The securement portion can include a clip device for securing to a brim of a helmet. The clip device can include a pair of fixed jaws and a spring loaded jaw that is resiliently biased to one of the fixed jaws.

The present invention can also provide a method of displaying images in a head mounted viewing system including providing a viewer having a microdisplay for displaying images. Viewing optics can provide viewing of the display. The display and the optics can be housed in a housing. Operation of the viewer can be controlled with integrated operational controls on the housing.

The present invention can also provide a method of mounting a viewer to a head with a mounting assembly, including securing a securement portion to headwear. A mounting member can be coupled to the securement portion. The viewer can be mounted to the mounting member. The mounting member can be capable of moving relative to the securement portion to move the viewer to first and second positions to position the viewer in front of either eye of the user.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
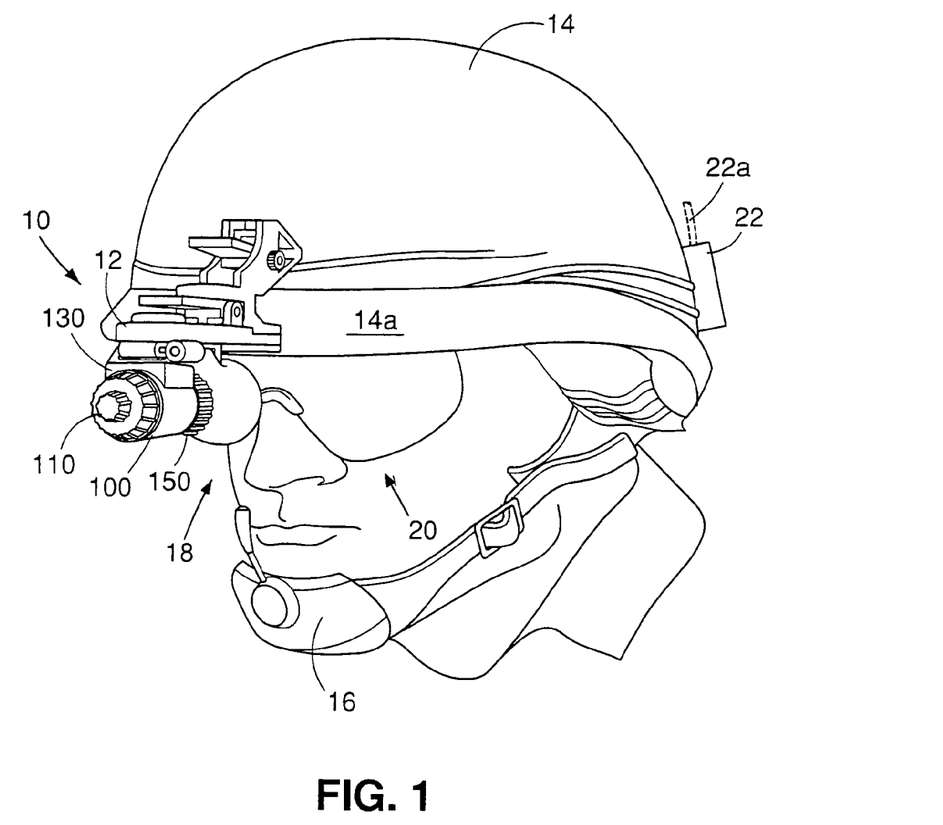
FIG. 1 is a perspective view of an embodiment of a viewing system mounted to a helmet.

Referring to FIG. 1, the present invention can provide a ruggedized, self contained head or helmet mounted display or viewing system 10. The system 10 can receive video and/or image inputs from a camera or other suitable source, and can be used for remote reconnaissance as well as with a thermal weapons sight (TWS), or a target acquisition or weapons firing system. The system 10 can include a viewer 100, a mounting assembly or adapter 12 for mounting the viewer 100 to headwear, such as a military helmet 14, as shown, and a power supply 22 for powering the viewer 100. The mounting assembly 12 can be coupled to the front brim 14a of the helmet 14. The mounting assembly 12 can move and position the viewer 100 in front of either the right 18 or left 20 eye of the user 16, for right 18 or left 20 eye use. The viewer 100 can be a monocular-type viewer and can employ a display 142 (FIG. 2) such as a microdisplay. The power supply 22 can be mounted on the rear of the helmet 14 and provide power to viewer 100 through a cable 22a. The viewer 100 can include integrated operational controls on the viewer itself, for easy access and operation of the viewer 100, so that the viewer 100 can be considered a self contained pod.

Referring to FIGS. 2-5, the viewer 100 can have a housing 128 that generally includes a front 118, a central 126 and a rear 116 housing portion. The display 142 can be mounted to a display ring or mounting member 140 and mounted within the housing 128. The display 142 can be shock resistant or ruggedized, and can be from Kopin Corporation, in Taunton, Mass. Depending upon the application at hand, the display 142 can be a black and white (B/W), red and white, green and white, a monochrome, a full color display, an active matrix liquid crystal display (LCD) or any other suitable type of display. A lens assembly 160 can be mounted to or within the housing 128 for allowing viewing of the display 142. A focus ring 150 can be coupled to the lens assembly 160 to allow the optics of the lens assembly 160 to be focused or make diopter adjustments. An eye cup 114 can be mounted to the front housing portion 118 and can shield light and can be rotatable for suitable positioning. Light from the viewer 100 can be shielded by the eye cup 114 at night from reflecting on a user's 16 face. Rings 144 and 146 can be included to provide proper mounting, positioning and operation of components. First 120, second 122 and third 124 driver boards, and integrated display interface and control electronics, can be mounted within and/or to the housing 128 for driving and operating the display 142. The viewer 100 can include a rotatable brightness knob 110 that is coupled to a brightness pot 112 for adjusting the brightness level of the display 142. The knob 110 can be located at the rear of the viewer 100 for easy access during use. A mounting adapter structure or member 130 can be included on the housing 128 as a connection point or mounting structure or surface for securing to the mounting assembly 12. The power supply 22 can include two CR123A lithium batteries or other suitable power source. In some embodiments, the power supply 22 can be a single 6 volt battery. Other suitable power supplies can be used which supply power in the 4 volt to 6.6 volt range.

Figure 2:
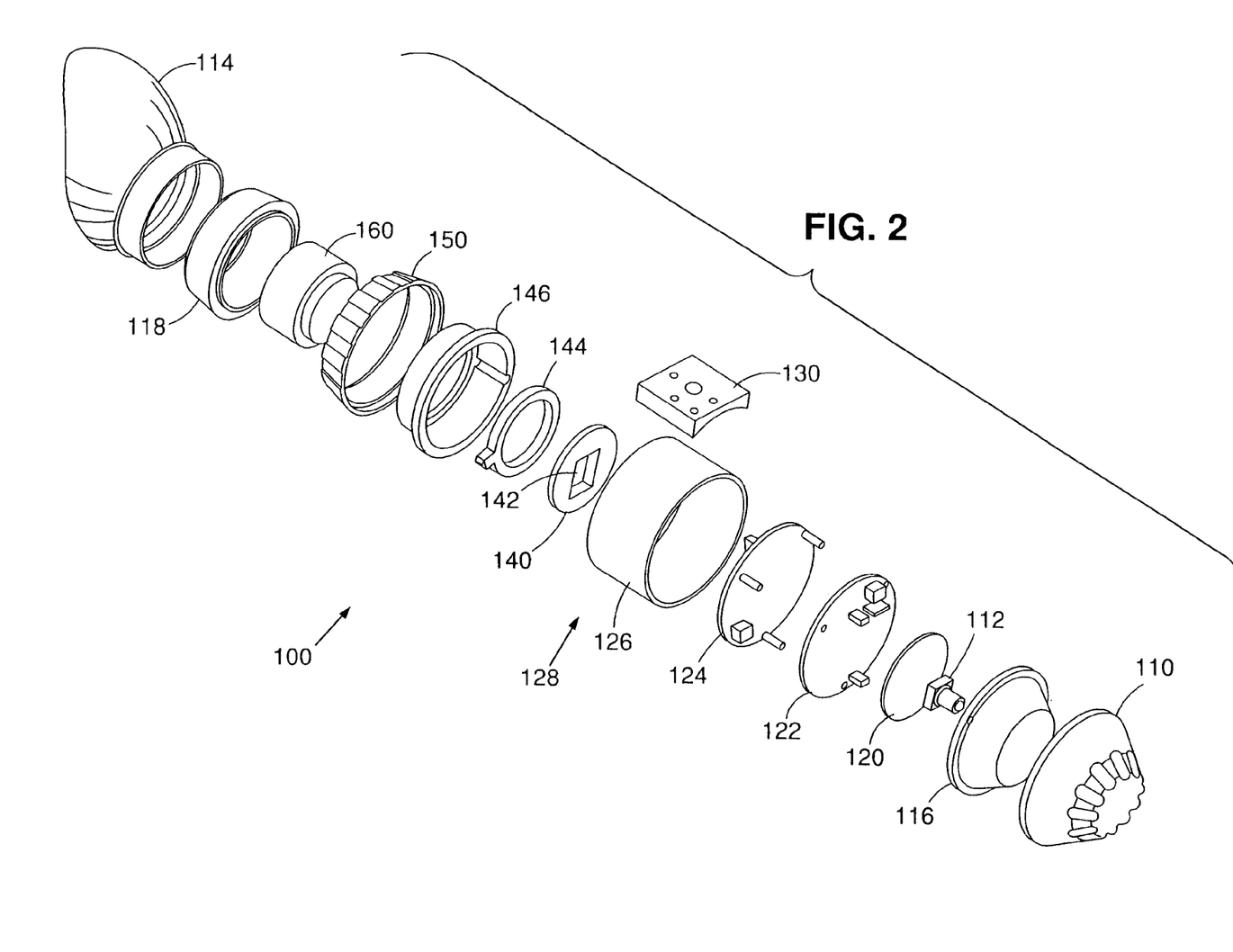
FIG. 2 is an exploded view of an embodiment of a viewer.
Figure 3:
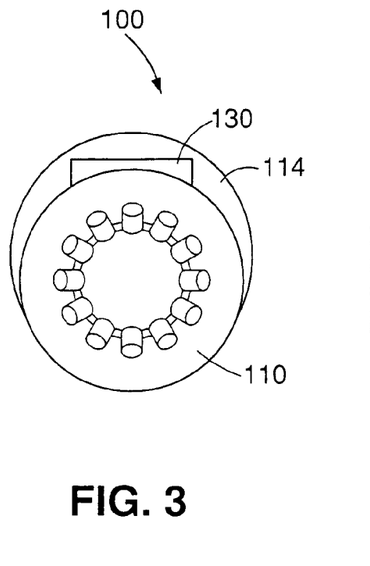
FIG. 3 is a rear view of the viewer of FIG. 2.
Figure 4:
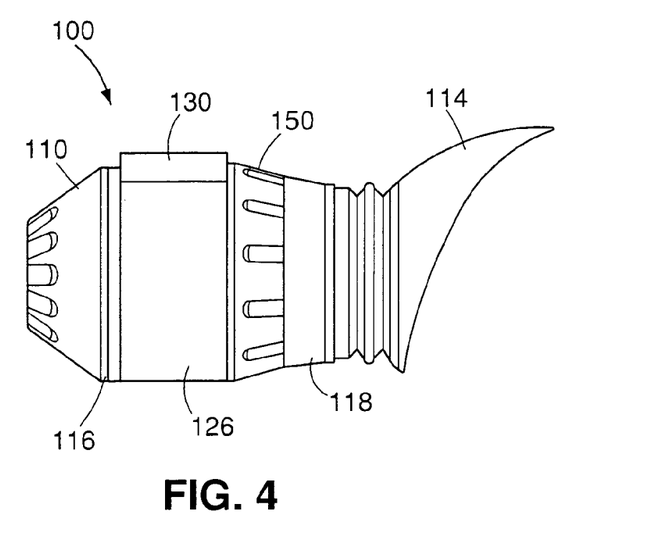
FIG. 4 is a side view of the viewer of FIG. 2.
Figure 5:
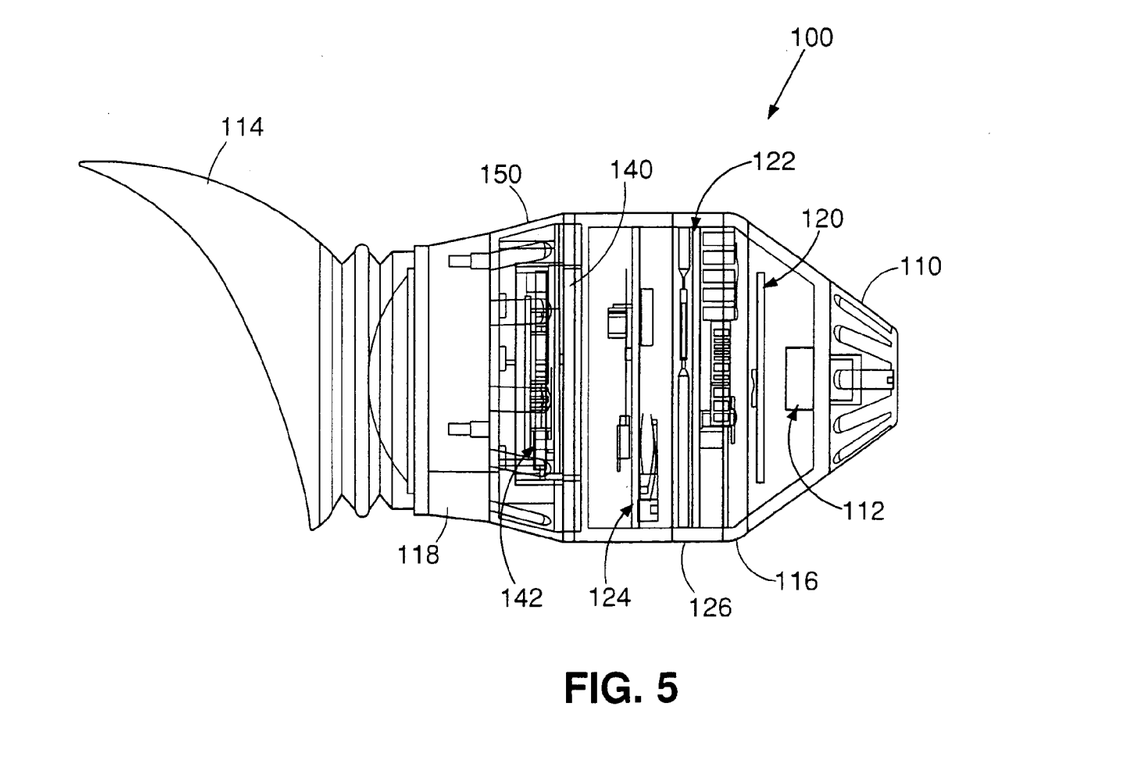
FIG. 5 is a side sectional view of the viewer of FIG. 2.

The viewer 100 can be mounted to the mounting assembly 12 by securing the mounting member 130 to the mounting assembly 12. The mounting assembly 12 can allow the viewer 100 to be positioned down for use as shown, or moved upwardly out of the way (stowed) when not in use. In addition, the mounting assembly 12 can move or pivot the viewer 100 along a horizontal arc into position either in front of the right 18, or the left 20 eye, depending upon if the user 16 is right handed or left handed. When in the up position, the viewer 100 can automatically go into "sleep" or "standby" mode, thereby conserving power. Backlighting for the display 142 can be turned off for security. The system 10 can have extremely low power consumption, such that standby times of approximately three weeks can be achieved. An embodiment of the mounting assembly 12 will be described in further detail later.

In one application, the viewing system 10 can be used as an auxiliary targeting viewer. The viewer 100 can display video and/or image data from a rifle or weapon mounted sight that includes a camera, or a camera sighting system, such as a thermal weapon sight or fire control system. The weapons sight can be a light, medium or heavy thermal weapons sight. The data supplied by the weapons sight and displayed can be a composite video image overlaying targeting or weapons firing information over video images. The viewer 100 can provide the user 16 with remote or "over the wall" viewing at battlefield conditions and the ability to acquire targets and fire the weapon from a protected covert or remote position.

Figure 6:
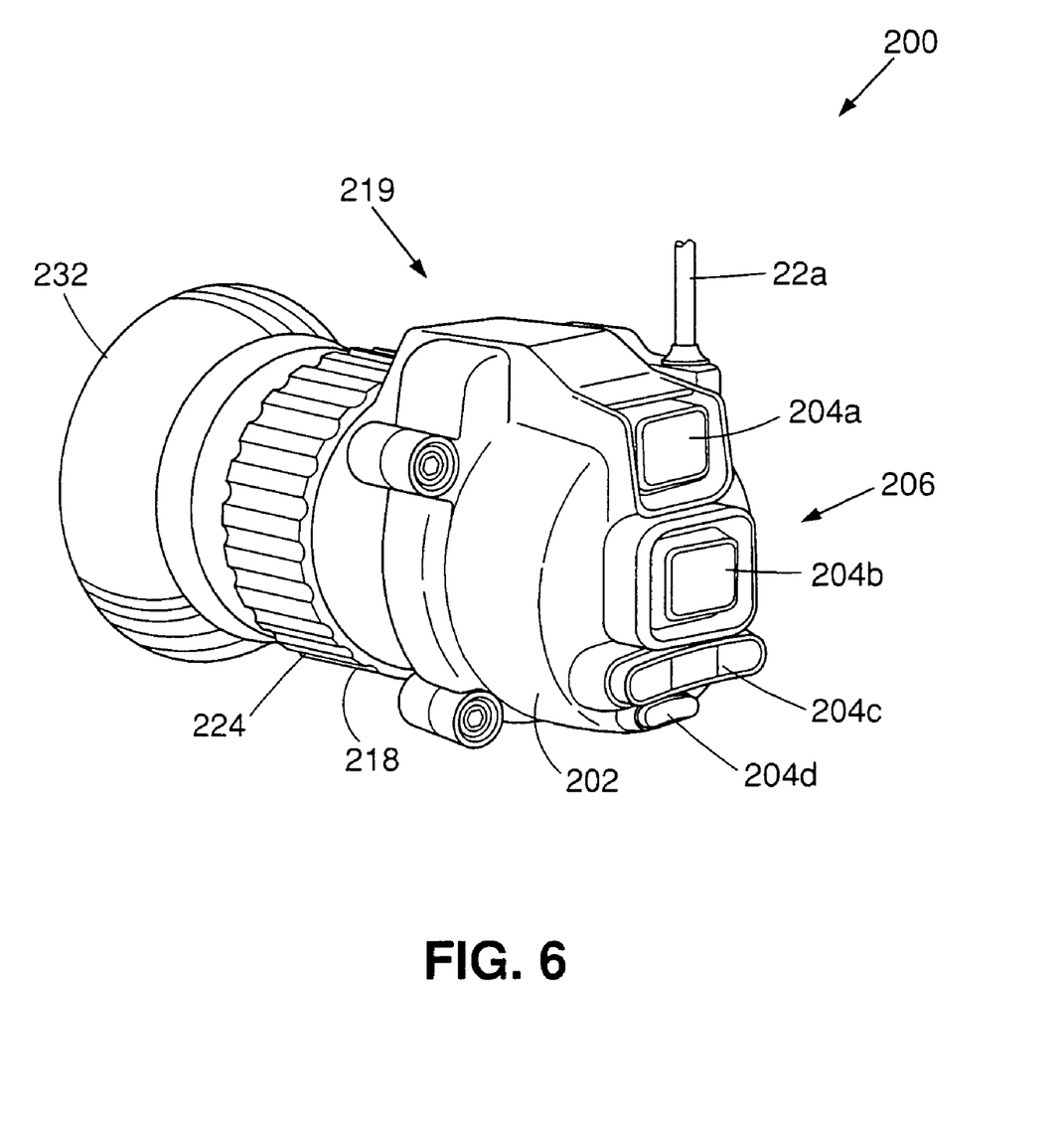
FIG. 6 is a perspective view of another embodiment of a viewer.
Figure 7:
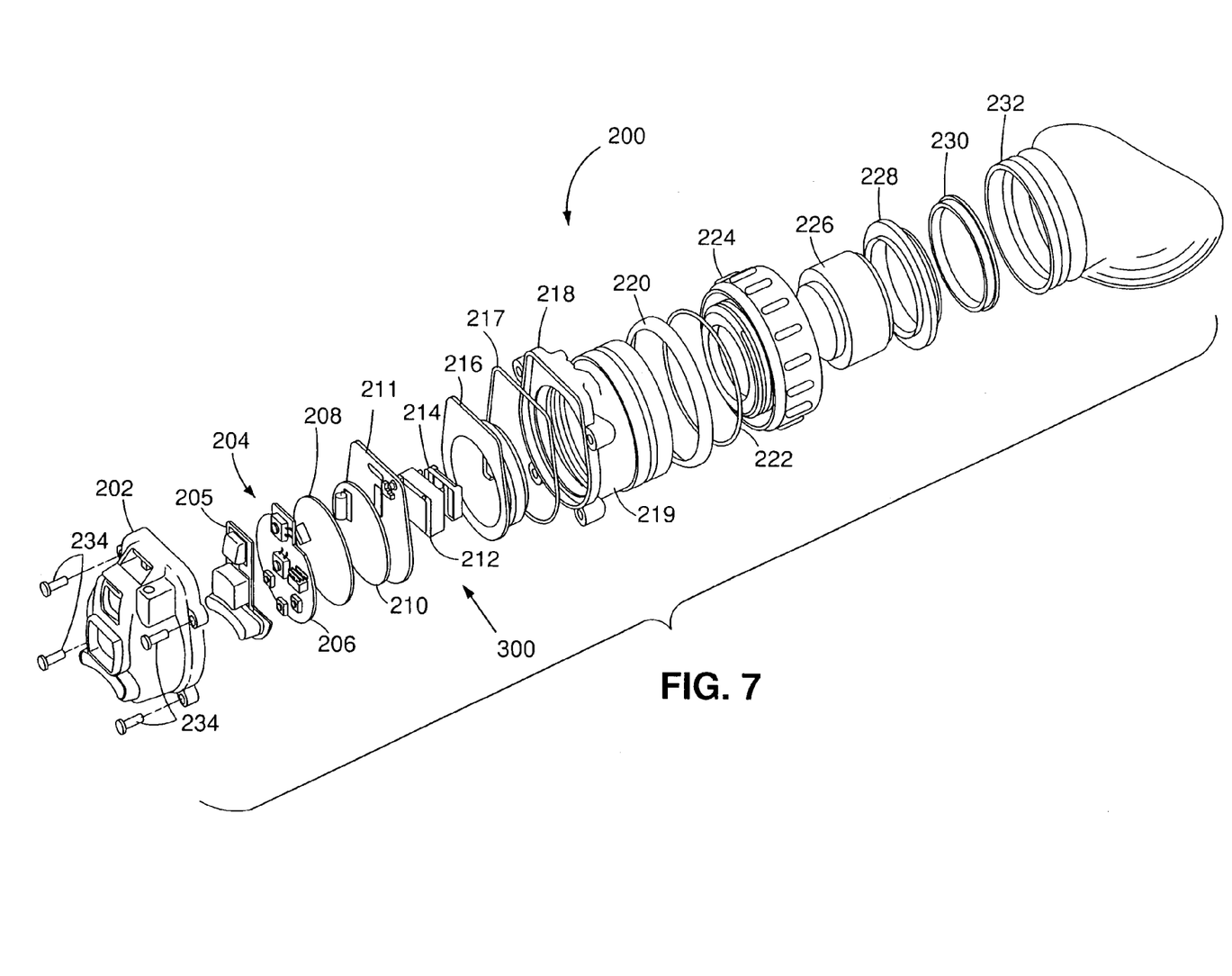
FIG. 7 is an exploded view of the viewer of FIG. 6.

FIGS. 6 and 7 depict a viewer 200 which is another embodiment of a viewer. The viewer 200 can have a housing 219 that generally includes a rear housing portion 202 and front housing portion 218 which can be held together by fasteners or screws 234. A gasket 217 can provide sealing against moisture between the rear 202 and front 218 housing portions. A microdisplay 214 can be mounted to a display retainer member 216 and mounted within the housing 219. The viewer 200 can be shock resistant or ruggedized. An optional backlight 212 can be included wherein the display 214 can be part of a display/backlight assembly 300. Different types of displays 214 can be employed, as previously discussed. A lens set 226 can be mounted to or within the housing 219 to allow viewing of the display 214 and can be adjusted by a focus ring 224 that is coupled to the lens set 226. The lens set 226 and focus ring 224 can be held in place by a lens retaining ring 228. A focus lock 220 and O-ring 222 can be positioned between the front housing portion 218 and the lens retaining ring 228. An eye cup 232 can be held in place by an eye cup retaining ring 230, and can be rotatable. A switch board 206, a power conditioning board 208, a first control board 210, and a second control board 211, can be mounted within the housing 219 for driving and operating the display 214. A button cover 205 can be included to cover control buttons 204 on the switch board 206 which extend through openings in the rear housing portion 202. The buttons 204 can include a power on/off button 204a for turning power on and off, a standby button 204b for putting the viewer 200 in and out of standby mode, a brightness up/down button 204c for adjusting brightness, and optionally, a color select button 204d for changing colors. A button or control can be used for contrast control. Integrating all of these controls into the housing 219 at the rear housing portion 202 can provide easy access and use for the user 16. All operational controls for viewer 200 can be incorporated on the viewer 200. Power and signals to the viewer 200 can be provided within cable 22a.

Figure 8:
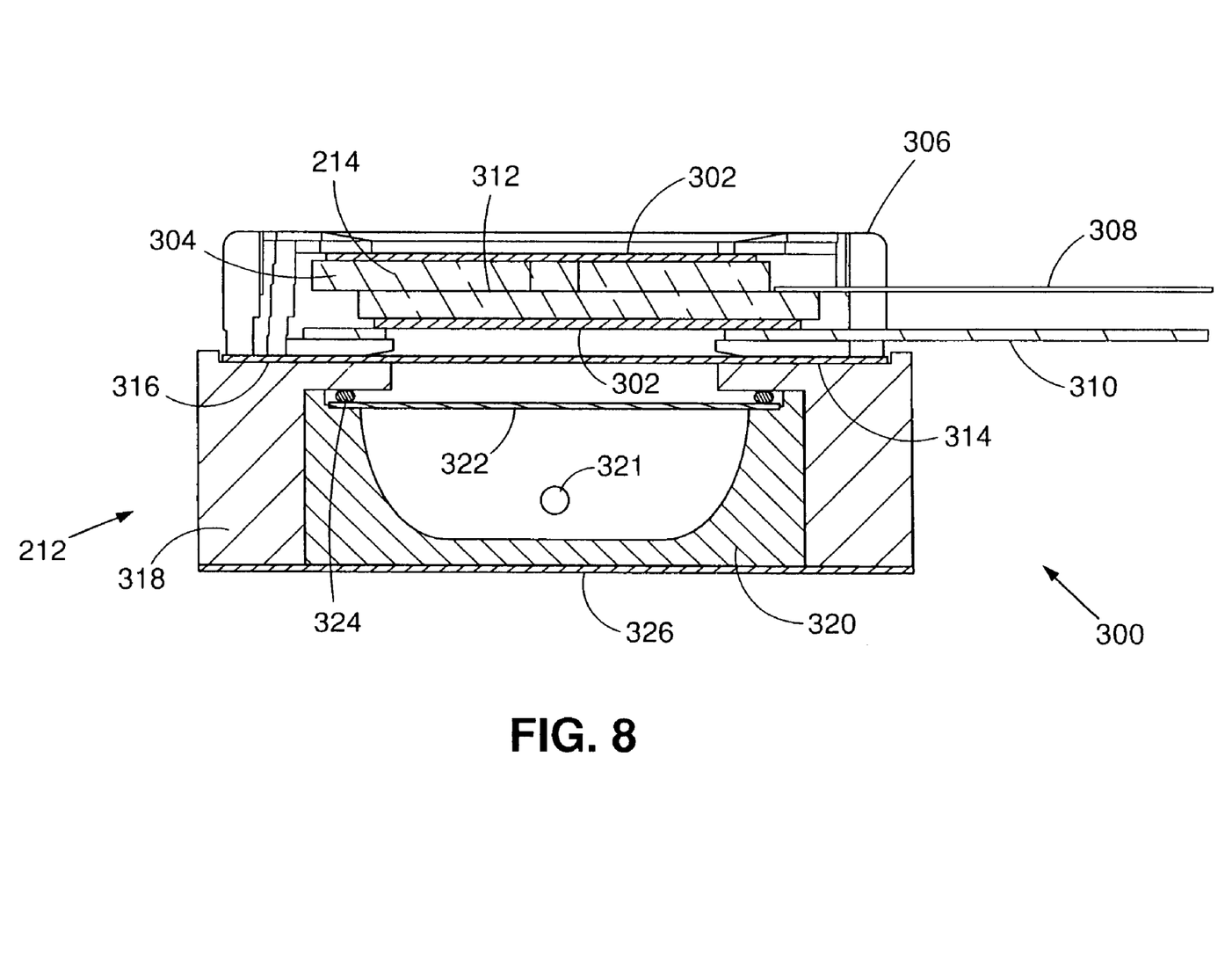
FIG. 8 is a side sectional view of a display/backlight assembly.

FIG. 8 depicts an embodiment of a display/backlight assembly 300. The display 214 can have an image plane 312 and can have polarizers 302 disposed on the outer surfaces of glass layers 304 of the display 214. The display 214 can be held in a base 306, and can have a flex cable 308 for providing images to the display 214 which extends from the base 306. A heater 310 can be mounted to the display 214 for warming the display 214 to operating temperature. The heater 310 for example, can warm the display 214 when in cold start mode, maintaining operating temperature, or during standby mode. The heater 310 can include internal and external heaters. A display cover 314 can be mounted to the display base 306 and spaced apart from the display 214. The display base 306 can be mounted to the backlight 212.

The backlight 212 can include a housing 318 having a reflector housing insert 320, and a film stack 322 including brightness enhancing film and diffuser components extending across the front of the reflector housing 320. The backlight 212 can have an illumination source 321. In one embodiment, the illumination source 321 can provide red, green, or white light and the color can be changed as desired, for example, to match the user's preference. In order to help prevent foreign objects and debris from being introduced into the backlight 212, the films in the film stack 322 can be laser cut to eliminate particulates which can be created by conventional die-cutting. Bumps or protrusions 324 can hold the film stack 322 in place. The backlight 212 can be sealed with front 316 and rear 326 seals. The front seal 316 can be a clear film cover which is applied over the backlight 212 to reduce the apparent foreign objects and debris at the focal plane of the display 214. The backlight 212 can be secured to the display 214 using double sided adhesive, which can provide a secure seal, further preventing any foreign objects and debris from appearing on the display 214.

In one embodiment, the viewer 200 can be about 40 mm in diameter, about 60 mm long and weigh about 90 grams. The viewer 200 can operate in temperatures ranging from about −40° C. to 65° C. The power consumption during operation can be about 450 mW and about 25 mW in standby mode. The power consumption for a cold start can be about 1500 mW. The brightness can be adjusted from less than 0.1 fL up to about 30-35 fL and the lens set 226 can have a diopter adjustment of +2 to −5. The system can provide at least 8 bits (256 levels) of gray scale over the full dynamic dimming range. The video source can be a RS-170 video input. Some embodiments of the display 214 can be monochrome and can have a resolution of 640×480 pixels with an active area about 7.66 mm by 5.76 mm. Other sizes are also contemplated.

Figure 9:
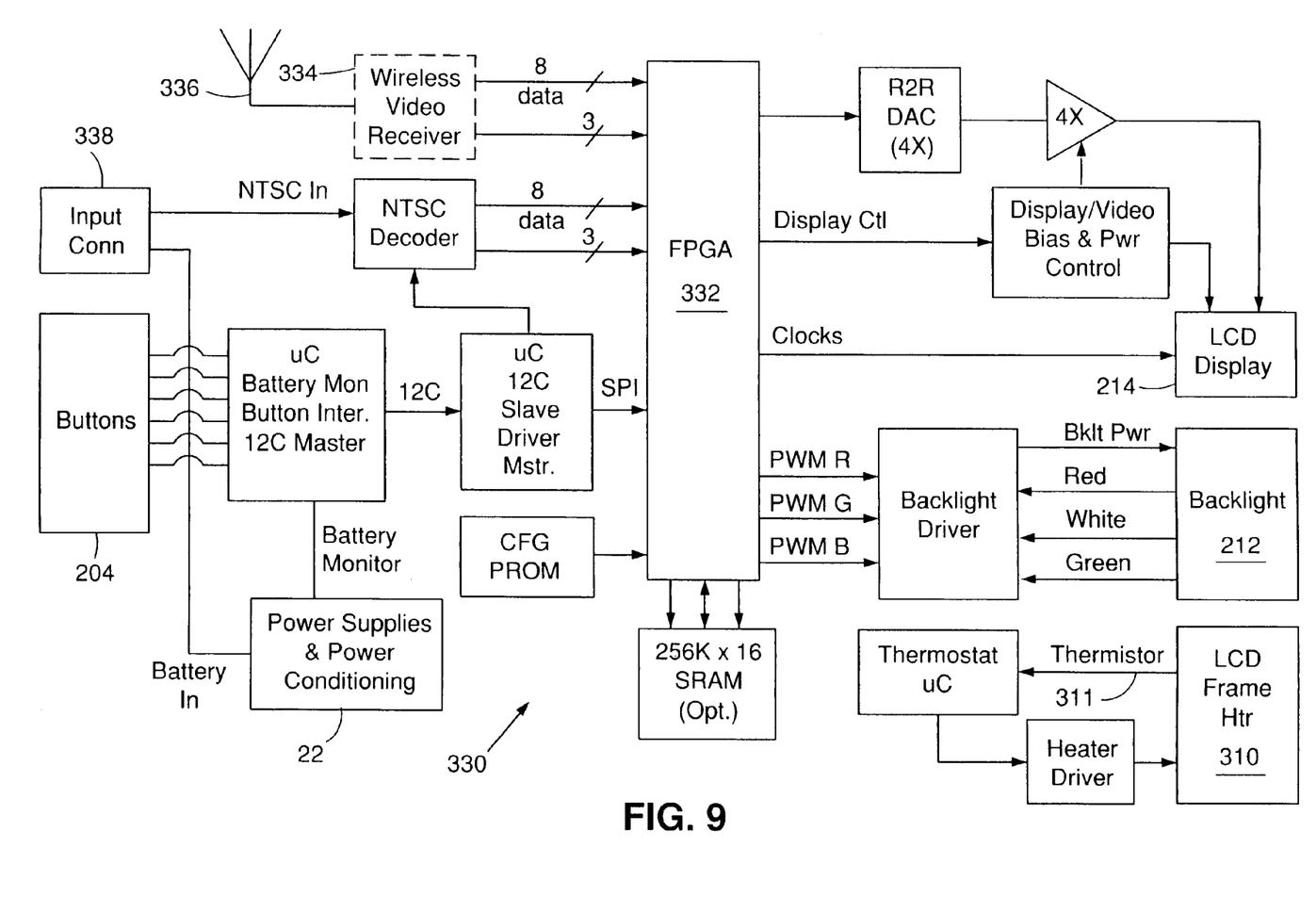
FIG. 9 is a block drawing of an embodiment of the image processing and display circuitry.

FIG. 9 depicts a block diagram of an embodiment of the image processing and display circuitry 330 for viewer 200. The input data can come from two different sources. One source can be the digital data from a camera or analog video from an outside source. Both can enter the viewer 200 via the same connector, but on different pins. Video image data can be received by an antenna 336 and wireless receiver 334 or by an input connector 338. The video image data is provided to processor 332 which provides signals to display 214 and the backlight 212 for operation. A display driver design can be packaged on a three circuit card assembly 208, 210 and 211 (FIG. 7) that interfaces to a 320×240, 60 Hz frame rate, 8-bit digital video data stream (RS-170 interfaced video). The electronics can then linearly interpolate to a 640×480 resolution and format the data to correctly drive the display 214. A display heater 310 and a brightness control loop can also be incorporated into the display driver with an I2C interface for system master control. Input from the buttons 204 can be provided to the processor 332 for controlling the operation of the viewer 200. A battery monitor can monitor the power of power supply 22 and provide a low battery warning.

Two modes can exist for digital input. The operating mode can be determined upon power up based on the state of the 320/640 discrete control. If the signal is low, the viewer 200 can operate in 320 mode. In this case, the digital data can be formatted as a 320×240, 60 Hz, parallel 8 bit monochrome signal with blanking, data valid and clock signals. If the discrete control line is high, the viewer 200 can operate in 640 mode. In this case, the digital data can be formatted as a 640×480, 30 Hz, parallel 8-bit monochrome signal with blanking, data valid and clock signals. The Analog data can be an SMPTE-170M signal. The Analog data can be converted to a digital format that can be input to the rest of the display driver.

Figure 10:
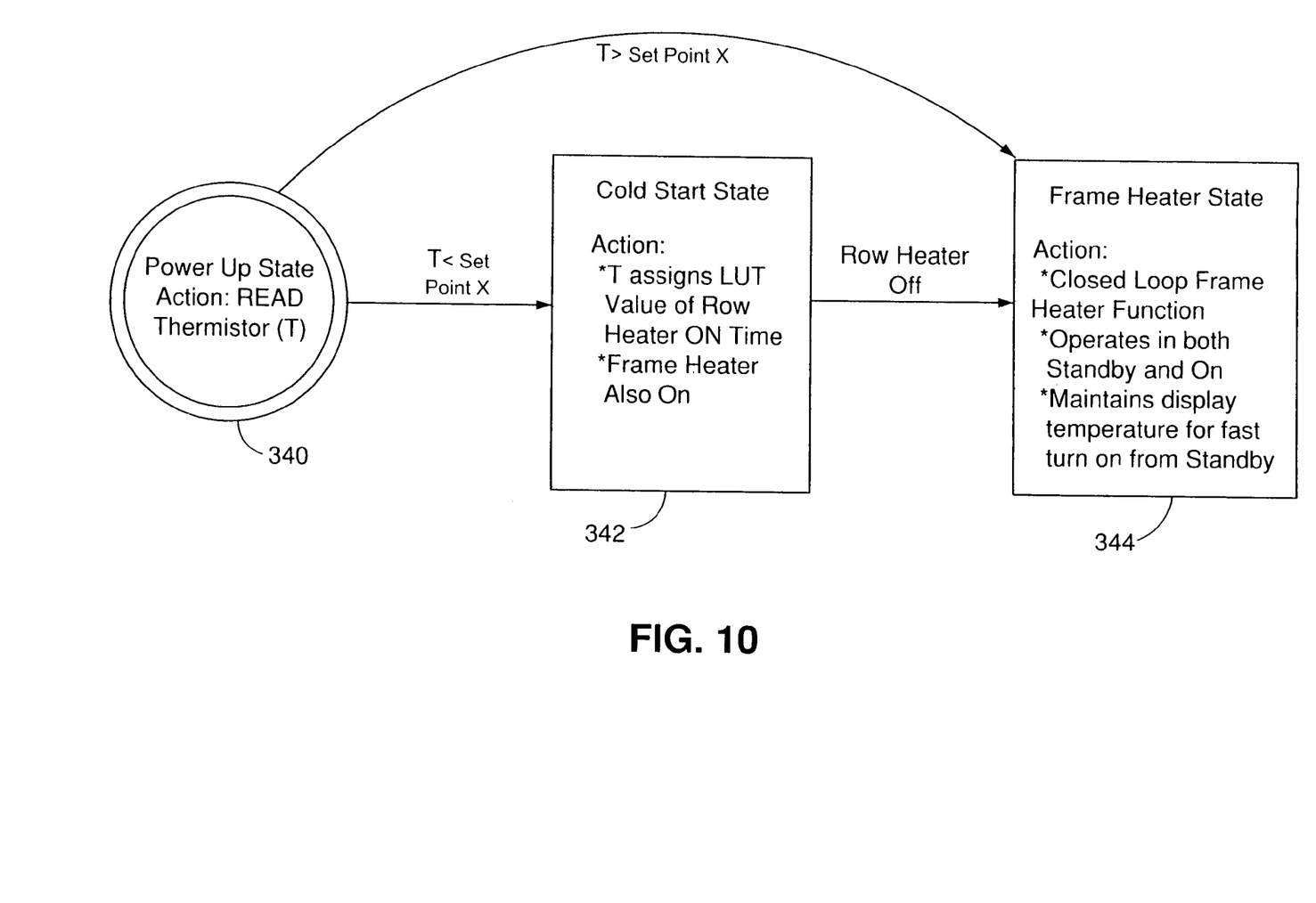
FIG. 10 is a state diagram for powering up.

Referring to FIG. 10, when powering up viewer 200 (state 340), a temperature reading from a thermister 311 (FIG. 9) associated with the display 214 can be made. If the temperature reading is below a set point, the viewer 200 can be considered to be in a cold start state 342. The heater 310 can be turned on to heat display 214 with internal and external heaters. When the display 214 is sufficiently heated, the internal heater is turned off and the external heater can be maintained in state 344, which can be for both operational and standby modes. If at state 340 the temperature is greater than the set point, state 344 can be directly achieved.

Figure 11:
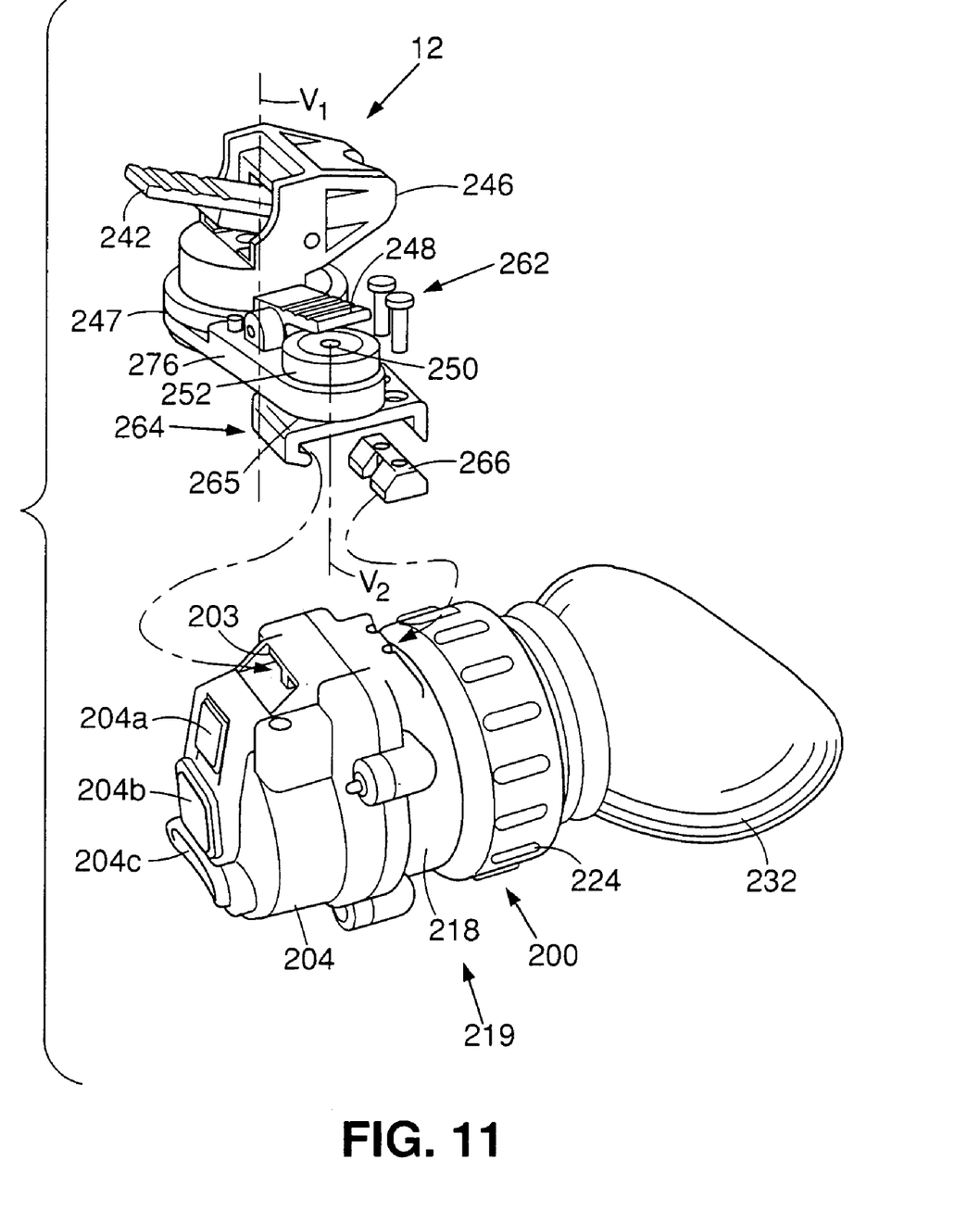
FIG. 11 is a perspective view depicting the mounting of the viewer of FIG. 6 to an embodiment of a mounting assembly.
Figure 12:
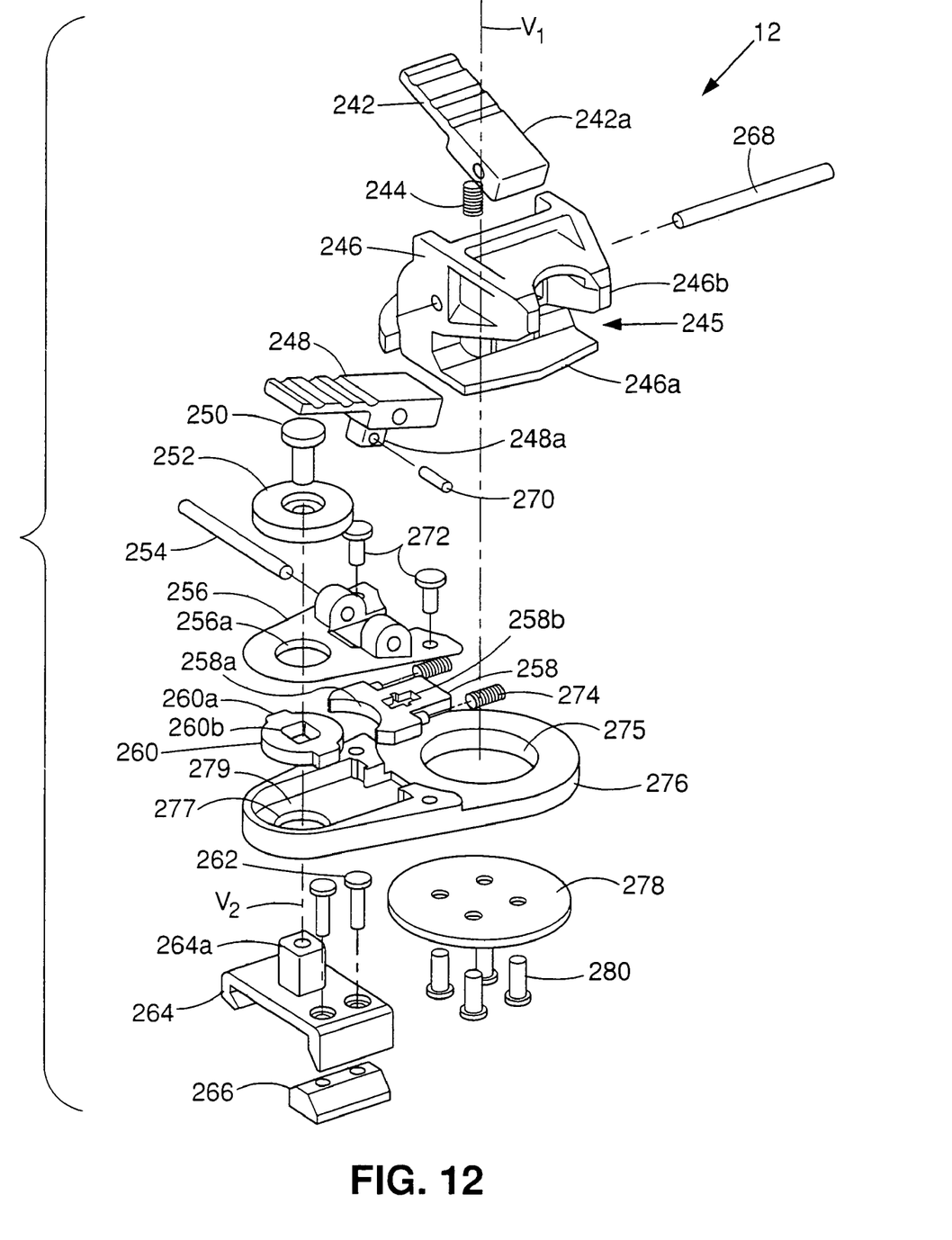
FIG. 12 is an exploded view of the mounting assembly.

The mounting assembly or adapter 12 can be mounted to various viewers. Different viewers can have different viewer mounting adapter structures, members, surfaces or locations for securement to the mounting assembly 12. Referring to FIGS. 11 and 12, the mounting assembly 12 can be mounted to viewer 200 as shown, with a particular viewer adapter 264 being used for securement to a mounting adapter structure, member or location 203 on viewer 200. Mounting assembly 12 can have a different viewer adapter for mating and securing to the mounting member 130 of viewer 100 or other viewers. Mounting assembly 12 is now described with regard to securement to viewer 200.

The mounting assembly 12 can include an adapter base or securement portion 246 that can have lower 246a and upper 246b jaws which can be separated by a gap 245 that can be sized for accepting the brim 14a of the helmet 14. In the orientation shown, the gap 245 generally extends laterally and can be accessed in a generally lateral or horizontal manner. A clip lever 242 can be pivotably mounted to the securement portion 246 by a clip pin 268. The clip lever 242 can be resiliently biased by a spring 244 toward the lower jaw 246a to clamp or grip the brim 14a of the helmet 14 between the clip jaw 242a and the lower jaw 246a, for securement to the helmet 14. The upper jaw 246b can provide support and stability for securing the brim 14a and can have some engagement with the brim 14a. The jaws 246a and 246b can be contoured for mating with a particular shaped brim 14a. Alternatively, the securement portion 246 can be configured to be fastened to the helmet 14 and/or other headwear by other suitable means, for example, with other fastening arrangements, or with fasteners including screws, rivets, etc. Consequently, various configurations of securement portions 246 can be used depending upon the type of helmet, headwear or fastening method.

A mounting member or arm 276 can be mounted to the securement portion 246. The mounting arm 276 can be rotatably mounted or coupled to the securement portion 246 by a rotary mounting member or arm joint 247 about an axis $V_1$, which in the orientation shown, can be vertical. The mounting arm 276 can be coupled to securement portion 246 by fasteners 280 such as screws, which can extend from a plate 278 through an opening 275 in the mounting arm 276 to rotatably sandwich the mounting arm 276 between securement portion 246 and plate 278.

A viewer adapter 264 can be secured to mounting arm 276 for securement to the viewer 200. As previously mentioned, the configuration of the viewer adapter 264 can vary depending upon the particular viewer that is mounted. The viewer adapter 264 can be rotatably mounted or coupled to the mounting arm 276 by a rotary adapter joint 265 about an axis $V_2$, which in the orientation shown, can be vertical, and laterally offset from axis $V_1$. The viewer adapter 264 can have a neck 264a, which extends through an opening 277 in mounting arm 276. An arm or member cover 256 can be secured to the top of the mounting arm 276 over a recess 279 by fasteners such as screws 272. The viewer adapter 264 can be rotatably secured to the mounting arm 276 by a fastener or screw 250 which extends through a washer 252, through a hole 256a in arm cover 256 and for securement to the neck 264a.

The viewer adapter 264 can be locked in desired positions with a locking mechanism. A generally circular pivot cam 260 can be fixed to the neck 264a of the viewer adapter 264 and positioned within recess 279. The pivot cam 260 can have two protrusions 260a on opposite sides and an opening 260b that is configured to engage the neck 264a of the viewer adapter 264 in a fixed or locked manner, for rotation with the viewer adapter 264 within recess 279. The neck 264a of the viewer adapter 264 and the opening 260b can each have a square cross section or configuration as shown. A brake stop 258 can be positioned within the recess 279 and can be resiliently spring loaded by springs 274 against the pivot cam 260 for locking the pivot cam 260 and viewer adapter 264 in place. The brake stop 258 can have an engagement surface 258a for engaging the pivot cam 260 and the protrusions 260a. The engagement surface 258a can have a convexly curved surface that engages the circular portion of the pivot cam 260, and end surfaces which engage the protrusions 260a for locking purposes. The brake stop 258 can be disengaged from the pivot cam 260 by a release lever 248 to allow about 180° of rotation of the pivot cam 260 and the viewer adapter 264 for reorientation of the viewer 200 on a horizontal plane, and reengaged for locking in a new or reversed orientation. As a result, the viewer 200 can be locked in two reversed positions about 180° apart. Reorientation can be conducted when the mounting arm 276 is pivoted from one eye to the other so that the viewer 200 can be in the proper orientation for viewing.

The release lever 248 can be pivotably mounted to the arm cover 256 by pivot pin 254 and can include a leg 248a which extends into a recess or slot 258b in the brake stop 258. The leg 248a can be engaged with the slot 258b by a pin 270. Pivoting motion of the release lever 248 can cause linear translation or motion of the brake stop 258. Pivoting of the release lever 248 downwardly can disengage the brake stop 258 from the pivot cam 260 and releasing or moving the lever 248 upwardly can allow re-engagement. In some embodiments, protrusions 260a on the pivot cam 260 can be positioned to provide other suitable ranges of locking. Additionally, other suitable locking mechanisms can be used.

The viewer adapter 264 can have a clamping configuration as shown for engaging the mounting structures 203 of the viewer 200 for securement to the viewer 200. The viewer adapter 264 can include a mounting wedge 266 which can be held in place with screws or fasteners 262.

In use, in order to switch viewer 200 from one eye to the other, for example from eye 18 to eye 20, the mounting arm 276 can be first rotated horizontally along or about joint 247 to swing or pivot the mounting arm 276 and the viewer 200 from eye 18 to eye 20. The viewer 200 can swing in an arc outwardly away from eye 18 along a horizontal plane towards eye 20. Initially, when the viewer 200 is first pivoted in front of eye 20, the rear housing 202 can be facing the user's 16 eye 20. The release lever 248 can then be depressed to disengage the brake stop 258 from the pivot cam 260 to unlock viewer adapter 264. The viewer 200 can then be rotated about 180° on its horizontal plane to reverse the orientation of the viewer 200 so that the eye cup 232 can face the eye 20. The lever 248 can then be released so that the brake stop 258 reengages the pivot cam 260 to lock the viewer 200 in the desired orientation for viewing. The eyecup 232 can then be rotated for proper fitting with the user's 16 face.

Figure 13:
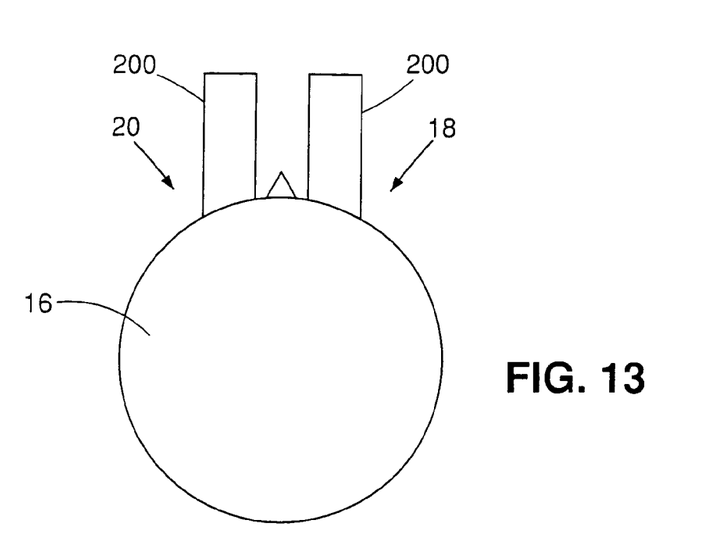
FIG. 13 is a schematic drawing of a binocular viewing system.

Referring to FIG. 13, two viewers, for example viewers 200, can be positioned in front of both the right 18 and the left 20 eyes for binocular viewing by the user 16. Separate image sources can be provided to the two viewers 200. For example, a thermal image can be provided to one eye and night vision can be provided to the other eye.

While this invention has been particularly shown and described with references to particular embodiments thereof, it will be understood by those skilled in the art that various changes in form and details may be made therein without departing from the scope of the invention encompassed by the appended claims.

For example, various features of the different embodiments can be combined together or omitted. Although various specifications for embodiments of the viewers are described, it is understood that the specifications can vary depending upon the application at hand. Although a particular mounting assembly 12 and viewers 100 and 200 have been described, it is understood that viewers 100 and 200 can be used with other mounting assemblies and mounting assembly 12 can be used with other viewers. In some embodiments, the viewers do not have to be head mounted but can be mounted in other manners, such as to vehicles, weapons, etc., and do not have to be remote.

What is claimed is:

1. A mounting assembly for a head mounted viewer comprising:
   a securement portion for securing to headwear, the securement portion comprising a clip device having a pair of fixed position stationary opposed jaws that are separated from each other by a fixed gap and which extend and are contoured for mating with a portion of the headwear therebetween, and a spring loaded jaw extending in the gap between the fixed opposed jaws resiliently biased toward one of the fixed jaws for further securement by providing clamping between the spring loaded jaw and said one of the fixed jaws; and
   a mounting member coupled to the securement portion, the viewer capable of being mounted to the mounting member, the mounting member capable of moving relative to the securement portion to move the viewer to first and second positions to position the viewer in front of either eye of a user.

2. The mounting assembly of claim 1 in which the mounting member can pivot horizontally along a mounting member joint about a first vertical axis.

3. The mounting assembly of claim 2 in which the mounting member includes a mounting location for mounting the viewer which is offset from the first vertical axis.

4. The mounting assembly of claim 3 in which the mounting location includes an adapter which can be secured to the viewer.

5. The mounting assembly of claim 4 in which the adapter is capable of pivoting along an adapter joint about a second vertical axis for pivoting the viewer about the second vertical axis.

6. The mounting assembly of claim 5 further comprising a locking mechanism for locking the adapter joint.

7. The mounting assembly of claim 6 in which the locking mechanism can lock the adapter joint in two positions about 180° apart.

8. The mounting assembly of claim 7 in which the locking mechanism includes a spring loaded locking member that can be disengaged by a release member.

9. The mounting assembly of claim 1 in which the securement portion is configured for securing to a brim of a helmet.

10. A method of mounting a viewer to a head with a mounting assembly comprising:
    securing a securement portion to headwear, the securement portion comprising a clip device having a pair of fixed position stationary opposed jaws that are separated from each other by a fixed gap and which extend and are contoured for mating with a portion of the headwear therebetween, and a spring loaded jaw extending in the gap between the fixed opposed jaws resiliently biased toward one of the fixed jaws for further securement by providing clamping between the spring loaded jaw and said one of the fixed jaws;
    coupling a mounting member to the securement portion; and
    mounting the viewer to the mounting member, the mounting member capable of moving relative to the securement portion to move the viewer to first and second positions to position the viewer in front of either eye of a user.

11. The method of claim 10 further comprising rotatably coupling the mounting member along a mounting member joint about a first vertical axis to allow the mounting member to pivot horizontally about the mounting member joint.

12. The method of claim 11 further comprising mounting the viewer to a mounting location on the mounting member which is offset from the first vertical axis.

13. The method of claim 11 further comprising securing the viewer to an adapter at the mounting location.

14. The method of claim 13 further comprising rotatably coupling the adapter along an adapter joint about a second vertical axis capable of pivoting the adapter and the viewer about the second vertical axis.

15. The method of claim 14 further comprising locking the adapter joint with a locking mechanism.

16. The method of claim 15 further comprising configuring the locking mechanism to lock the adapter joint in two positions about 180° apart.

17. The method of claim 16 further comprising providing the locking mechanism with a spring loaded locking member that can be disengaged by a release member.

18. The method of claim 10 further comprising securing the securement portion to a brim of a helmet.

\* \* \* \* \*

UNITED STATES PATENT AND TRADEMARK OFFICE
CERTIFICATE OF CORRECTION

| | | |
|---|---|---|
| PATENT NO. | : 7,898,503 B2 | Page 1 of 1 |
| APPLICATION NO. | : 11/403559 | |
| DATED | : March 1, 2011 | |
| INVENTOR(S) | : Lawrence M. Cuprys et al. | |

It is certified that error appears in the above-identified patent and that said Letters Patent is hereby corrected as shown below:

In Claim 13, Column 9, line 8, delete "11" and insert --12--.

Signed and Sealed this
Twenty-sixth Day of April, 2011

David J. Kappos
*Director of the United States Patent and Trademark Office*